(12) United States Patent
Kehrmann et al.

(10) Patent No.: US 9,776,128 B2
(45) Date of Patent: Oct. 3, 2017

(54) SCRUBBER TOWER OF A FLUE GAS PURIFICATION DEVICE

(71) Applicant: Doosan Lentjes GmbH, Ratingen (DE)

(72) Inventors: Kai Kehrmann, Castrop-Rauxel (DE); Frank Oberheid, Oberhausen (DE); Oguzhan Narin, Sprockhovel (DE); Annette Ziemann-Nothe, Essen (DE)

(73) Assignee: Doosan Lentjes GmbH, Ratingen (DE)

( * ) Notice: Subject to any disclaimer, the term of this patent is extended or adjusted under 35 U.S.C. 154(b) by 0 days.

(21) Appl. No.: 14/914,303

(22) PCT Filed: Jun. 26, 2014

(86) PCT No.: PCT/EP2014/063563
§ 371 (c)(1),
(2) Date: Feb. 25, 2016

(87) PCT Pub. No.: WO2015/039779
PCT Pub. Date: Mar. 26, 2015

(65) Prior Publication Data
US 2016/0199776 A1    Jul. 14, 2016

(30) Foreign Application Priority Data
Sep. 20, 2013 (EP) ..................... 13185366

(51) Int. Cl.
  *B01F 3/04* (2006.01)
  *B01D 53/18* (2006.01)
  *B01D 3/22* (2006.01)

(52) U.S. Cl.
  CPC ............ *B01D 53/18* (2013.01); *B01D 3/22* (2013.01); *B01F 3/04* (2013.01);
  (Continued)

(58) Field of Classification Search
  CPC .. B01D 3/22; B01D 53/18; B01D 2252/1035; B01D 2257/302; B01D 2257/504; B01D 2258/0283; B01F 3/04; Y02P 70/34
  (Continued)

(56) References Cited

U.S. PATENT DOCUMENTS

| | | | |
|---|---|---|---|
| 999,320 A * | 8/1911 | Kyll .................. | B01D 3/22 261/108 |
| 3,025,041 A | 3/1962 | Sandler ................. | 261/114 |

(Continued)

FOREIGN PATENT DOCUMENTS

| | | | | |
|---|---|---|---|---|
| CN | 101530729 A | 9/2009 | ............ | B01D 53/60 |
| CN | 202823099 U | 3/2013 | ............ | B01D 53/18 |

(Continued)

OTHER PUBLICATIONS

International Search Report from corresponding International Patent Application No. PCT/EP2011/063563, dated Sep. 22, 2014 (English-language translation provided).

*Primary Examiner* — Charles Bushey
(74) *Attorney, Agent, or Firm* — Kusner & Jaffe

(57) ABSTRACT

A scrubber tower of a flue gas purification device, comprising: a flue gas entrance and a flue gas exit, a liquid entrance and a liquid exit, a contact area for said flue gas and said liquid between said flue gas entrance and said liquid entrance, at least one tray installation positioned within said contact area and across at least 50% of a horizontal extension of said contact area. The tray installation provides a multiplicity of through openings for said flue gas and said liquid respectively, which through openings being adjustable individually, in groups or all together in their respective cross sections.

8 Claims, 3 Drawing Sheets

(52) U.S. Cl.
CPC ............... *B01D 2252/1035* (2013.01); *B01D 2257/302* (2013.01); *B01D 2257/504* (2013.01); *B01D 2258/0283* (2013.01); *Y02P 70/34* (2015.11)

(58) Field of Classification Search
USPC .................................... 261/113, 114.3, 114.5
See application file for complete search history.

(56) References Cited

U.S. PATENT DOCUMENTS

| | | | | | |
|---|---|---|---|---|---|
| 3,045,989 | A | * | 7/1962 | Kittel | B01D 3/22 202/158 |
| 3,162,701 | A | | 12/1964 | Joor, II | 261/114 |
| 3,325,155 | A | * | 6/1967 | Bahout | B01D 3/163 137/512.1 |
| 3,608,875 | A | * | 9/1971 | Kriegel | B01D 3/163 261/114.2 |
| 3,804,387 | A | * | 4/1974 | Brinzei | B01D 3/163 261/114.4 |
| 3,855,368 | A | * | 12/1974 | Prochazka | B01D 3/22 261/81 |
| 3,942,951 | A | * | 3/1976 | Atoiants | B01D 3/18 137/625.31 |
| 4,146,950 | A | | 4/1979 | Powers | 29/157 |
| 5,246,471 | A | | 9/1993 | Bhat et al. | 55/223 |
| 5,690,899 | A | | 11/1997 | Makkinejad et al. | 423/243.01 |
| 6,440,379 | B1 | | 8/2002 | Verrill et al. | 423/243.01 |
| 6,755,943 | B1 | * | 6/2004 | Mizutani | B01D 3/22 202/158 |
| 9,248,382 | B2 | * | 2/2016 | Giese | B01D 3/163 |

FOREIGN PATENT DOCUMENTS

| | | | |
|---|---|---|---|
| EP | 0756890 | 2/1997 | ............... B01D 53/50 |
| FR | 1237299 | 7/1960 | ............... B01D 3/16 |
| GB | 1137853 | 12/1968 | ............... B01D 3/22 |
| GB | 1222011 | 2/1971 | ............... B01D 47/02 |
| JP | S 4855177 | 8/1973 | ............... B01D 3/22 |
| JP | H09-192445 A | 7/1997 | ............... B01D 53/34 |
| JP | 2000300931 A | 10/2000 | ............... B01D 53/18 |
| WO | WO 01/34288 A1 | 5/2001 | ............... B01J 10/00 |

* cited by examiner

SCRUBBER TOWER OF A FLUE GAS PURIFICATION DEVICE

FIELD OF THE INVENTION

The invention relates to a scrubber tower (also called scrubbing tower, absorption tower, gas-liquid contact device or washing tower; german: Wäscher, Waschturm or Absorptionsturm) of a flue gas purification device.

The invention particularly relates to a gas purification device and a corresponding scrubber tower operating with seawater as a liquid (including a corresponding slurry) to absorb undesired components from the flue gas. That is why said liquid (fluid) is also called an absorbent or absorbing agent. The invention may also be used in connection with other absorbents such as limestone based materials.

BACKGROUND OF THE INVENTION

Flue gas, which may derive from a power station, is often introduced at the lower part of the scrubbing tower into the scrubbing tower—via a corresponding entrance—and further guided upwardly to a flue gas exit. Along this way through the scrubber tower the flue gas is brought into contact with the said liquid (fluid absorbent), often in a counter flow. Correspondingly the absorbent is introduced into the scrubber tower above the flue gas inlet, e.g. at the upper end of the scrubber tower, thus defining the section between the flue gas entrance and the absorbent inlet as the absorbing zone, which represents a contact area for said liquid and said flue gas.

It is further known to arrange nozzles at the upper end of the absorbing zone, by which the fluid absorbent is sprayed as fine particles (droplets) into the contact area to provide a preferably large reaction surface with the flue gas to be purified. The invention will be described hereinafter with respect to this generic design of a scrubber, but includes other designs as well, for example scrubber towers, where the gas is transported in a substantially horizontal flow direction.

The absorbent, also called scrubbing fluid, for example seawater, may absorb and/or chemically interact with various components/impurities of the flue gas, such as sulphur oxides and $CO_2$.

A device and scrubbing tower as described above is known from EP 0756 890 B1.

It is further known from U.S. Pat. No. 5,246,471 to arrange one or more packings (trays) within the scrubber tower and across the flow path of the flue gas, upon which the liquid is sprayed. The trays have openings of defined size (cross section). By such a tray the liquid is temporarily stored onto the tray and thus a liquid bath formed. This allows the flue gas, penetrating the liquid bath upwardly, to get into a more intensive contact with the absorbing liquid. As a consequence, the degree of absorption is increased.

The invention starts from the object to further improve the degree of purification of the flue gas and/or to make the purification process more reliable.

The invention is based on the following findings:
  I. The transfer area, which defines the reaction surface between gas and liquid in the contact area of a scrubber tower, depends—inter alia—from the gas volume (% by volume) within the liquid bath, the gas velocity within the contact zone, the (average) size of the gas bubbles and the vertical height of the liquid bath.
  II. The degree of purification is dependent—inter alia—from the gas volume to be treated, the gas velocity, the size of the gas bubbles, the contact time between gas and liquid, the transfer area between gas and liquid.
  III. Finer (smaller) gas bubbles increase the transfer area compared with larger bubbles (assuming both groups having the same total volume). The initial gas bubble diameter, i.e. the size of the gas bubbles when entering the liquid bath, again is dependent on the factors mentioned under II Modern power stations frequently vary their operating load, depending on the overall power demand, the type and quality of the energy source etc. This leads to considerable variations in the corresponding gas quantity, quality (gas composition) and gas velocity. In view of the parameters mentioned under I to III above the gas purification process often correlates with these parameters, i.e. the gas purification process is oversized or undersized. As a consequence the gas purification does not fulfil the corresponding economical and ecological demands any more.

SUMMARY OF THE INVENTION

These disadvantages may be overcome by a scrubber tower which is equipped with a tray installation (packing) comprising openings of variable/alterable size and/or cross section. Depending on the respective operation mode of the corresponding plant (e.g. the power station) and thus depending on the corresponding quality, quantity and velocity of the flue gas, these openings may be adjusted (in particular reduced in size or enlarged in size to allow less or more gas/liquid to pass through) in a suitable way to achieve the best purification results. This is why said tray installation may also be qualified as an adjustable tray, flexible tray, dynamic tray, etc.

At the same time the quantity of the liquid absorbing agent (like seawater, lime slurry) can be adapted correspondingly.

In its most general embodiment the invention relates to a scrubber tower of a flue gas purification device, comprising:
  a flue gas entrance and a flue gas exit,
  a liquid entrance and a liquid exit,
  a contact area for said flue gas and said liquid between said flue gas entrance and said liquid entrance,
  at least one tray installation positioned within said contact area and across at least 50% (often >60%, >70%, >80%, >90%) of a horizontal extension of said contact area, wherein
  said tray installation provides a multiplicity of through openings for said flue gas and said liquid respectively, which through openings being adjustable individually, in groups or all together in their respective cross sections.

In a generic scrubber tower design mentioned above the flue gas entrance is at a lower part, the flue gas exit at an upper part, the liquid entrance at an upper part and the liquid exit at a lower part of the scrubber tower. Typically there are means (pumps, fans) for moving the gas through the scrubber tower.

The invention includes the following embodiments, individually or in combination:
  the open cross section of one or more openings is reduced
  the open cross section of one or more openings is enlarged
  one or more openings are totally closed
  This control function may be achieved by a tray construction, which comprises one or more layers. In the first mentioned embodiment the openings of said one layer are alterable in size. This may be achieved by openings providing a valve function, which will be described later. Such design may also be used in multi-layer tray installations, which may also be designed as follows:

a first layer with a multiplicity of through openings,
        at least one further layer with a multiplicity of through openings, wherein
        said at least one further layer being arranged vertically offset to any adjacent layer.

Changing one or more openings in one layer immediately results in a change of size and number of gas bubbles entering into the liquid or liquid bath by the other layer.

This control step may be replaced or added by a scrubber tower, wherein at least one of the following construction elements is moveable in at least one direction of the coordinate system or/and rotatable:

the tray installation as such,
    part of the tray installation,
    at least one layer of the tray installation,
    at least one part of one layer.

This design gives a valve function to the openings and this will be further illustrated by way of simple examples:

Example A

The tray installation is made of two layers (trays) T1, T2 of identical shape, identical number and size of openings. Both layers T1, T2 are arranged on top of each other. Movement of one (T1) relative to the other (T2) enables to control the flow through area between zero and max, wherein max corresponds to the flow through area of each of said trays T1, T2.

Example B

The installation is made of a tray T3 comprising several bars, horizontally arranged at a distance to each other and fixed at a peripheral frame, and a tray/layer T4 of same construction as T3, but arranged horizontally and vertically offset to T3 within the contact area of the scrubber tower. The flow-through openings of both trays T3, T4 are defined between horizontally adjacent bars. By moving tray T3 against the second tray T4 the cross section of the flow through openings of tray T4 become smaller when the bars of tray T3 approach/enter into said space between adjacent bars of T4. By corresponding dimensions this design even allows to close the flow through openings of tray T4 in case of need. This embodiment may be combined with one tray rotating relative to the other.

Vertically adjacent layers are displaceable parallel to each other (including relative to each other), mostly in a horizontal direction and/or perpendicular to each other, mostly in a vertical direction. "Parallel" and "perpendicular" includes embodiments with trays/layers inclined to the horizontal/vertical.

According to another embodiment at least one layer of said tray installation (package) is equipped with discrete male sections, able to cover corresponding female sections like through openings of an adjacent layer and to vary the cross section of these through openings when any of said layers is displaced. This includes embodiments with male sections of one layer penetrating into female sections of an adjacent layer when at least one of said layers is dislocated. This embodiment is similar the example B with the proviso that the layer comprising the male portions may have a totally different design compared with the other layer.

These embodiments allow for a tray installation (packing) or at least one layer thereof being shaped according to any of the following designs: grid, slatted frame, punched plate, perforated sheet, egg box, slotted plate, sphere packing.

Each layer (tray) may extend over the total horizontal extension of the contact zone and is fixed or moveably attached to the scrubbing tower wall.

Another option to achieve the desired adjustable flow-through openings is characterized by a packing, wherein at least one layer of said packing (tray installation) or at least one part of one layer of said tray installation or at least one part of said tray installation is floatable in the flue gas, in the liquid or in mixtures thereof.

Again this will be further illustrated by way of a simple example:

Example C

This embodiment corresponds to example B with the proviso that the upper layer/tray T3 is made floatable onto a liquid bath (provided in/above the contact zone) by filling air into said bars. By sucking off air and/or increasing the mass of the bars/tray T3 this tray will plunge into said liquid bath and correspondingly approach the other tray T4 arranged beneath, thereby varying the size of the flow through openings of the tray T4. By reducing the weight of the bars/tray and/or by introducing air into the bars of tray T3 the distance between the two adjacent trays may be enlarged again when tray T3 ascents again.

At least one opening may be designed as an individual valve. The valve function may be realized as well by the following:

the tray installation, at least one layer of the tray installation, at least one part of one layer of the tray installation or at least one part of the tray installation is variable in its size by infilling a fluid (liquid, gas) or extracting a fluid.
    at least some of the flow-through openings of the tray installation are equipped with inserts variable in size by infilling a fluid or extracting a fluid.

In other words, the cross section of one or more flow-through openings is adjusted by enlarging or reducing the size of means/inserts placed within or adjacent to these openings. The same effect is possible by enlarging or reducing the size of construction elements adjacent to the flow through openings.

At least part of the through openings may have a cross sectional shape of the group comprising: polygon, in particular rectangle, circle, oval, ring, annulus (german: Ringspalt), divided circle (german: Teilkreis), partial ring (german: Ringabschnitt), sinuous line (german: Schlangenlinie), meander.

The package (tray installation) can be subdivided into compartments, which are arranged in a horizontal fashion to allow sectional variations and to increase the homogeneity of the liquid bath.

Further features of the invention will derive from the sub-claims and the other application documents.

BRIEF DESCRIPTION OF THE DRAWINGS

The invention will now be described with respect to the attached schematic drawing, disclosing in.

In the Figures parts having the identical or equivalent function are referenced by the same numeral.

DETAILED DESCRIPTION OF THE INVENTION

Figure 1:
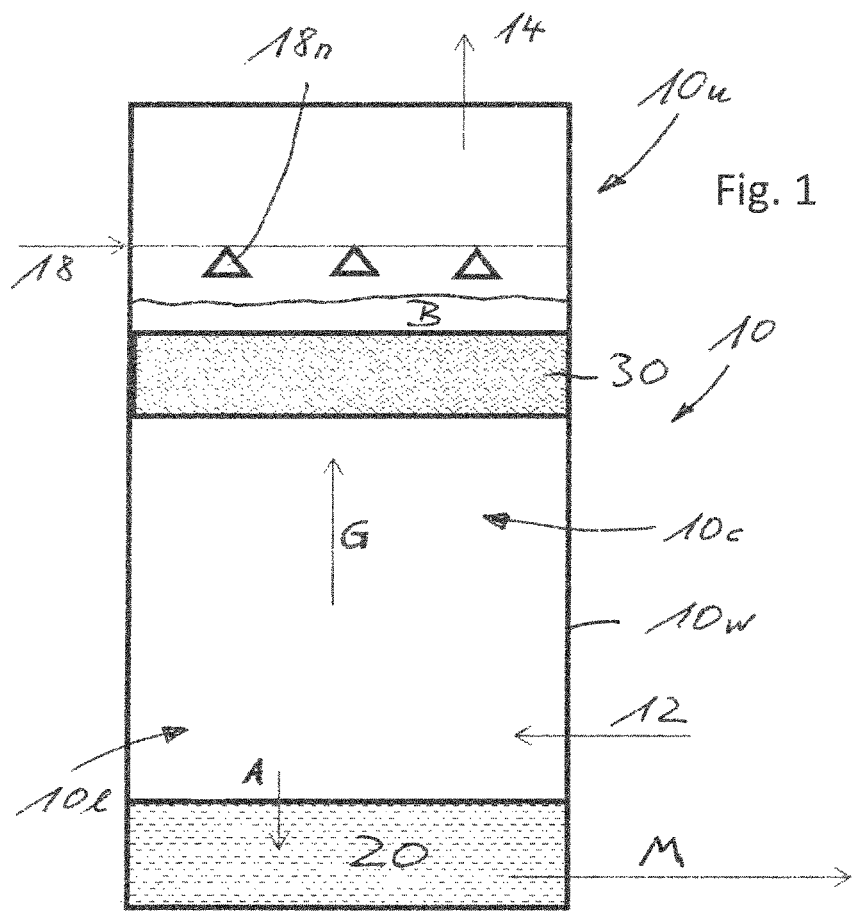
FIG. 1: A general overview of a scrubber tower of a flue gas purification device.

FIG. 1 represents the main features of a scrubber tower 10 by which a flue gas from an associated power station (not illustrated) will be purified.

Scrubber tower 10 comprises a cylindrical outer wall 10*w*, a flue gas entrance 12 at a lower part 10*l* and a flue gas exit 14 at an upper part 10*u*, a liquid (seawater) entrance 18 at said upper part 10*u* and a liquid exit 20 at said lower part 10*l*. Said liquid exit 20 corresponds to a so called sump area beneath the lower part 10*l* of scrubber tower 10. The return line to the sea is marked by arrow M.

The liquid is fed into the cylindrical space of scrubber tower 10 via nozzles 18*n*, attached to said liquid inlet pipe 18. The seawater absorbent further takes its way downwardly (arrow A) within scrubber tower 10 (following gravity), thereby getting in contact with said flue gas flowing upwardly (arrow G) in said scrubber tower 10 (the flue gas flow is generated by a—non-illustrated—fan).

The corresponding counter flow area of liquid absorbent and flue gas is called the contact area (contact zone 10*c*). Within said contact zone 10*c* a tray installation 30 is mounted, which extends over the total horizontal cross-sectional area of said scrubber tower 10.

This tray installation (packing) 30 urges the gas and the liquid respectively to penetrate (flow) through it. In the following, various embodiments of said packing 30 are further illustrated.

Figure 2:
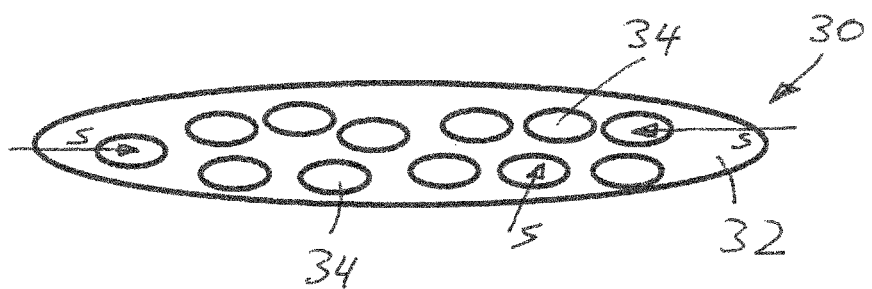
FIG. 2: A first embodiment of a tray installation.

FIG. 2 represents the simplest way to construct such packing 30, namely by one tray-like layer 32 with a multiplicity of evenly distributed through holes 34. The through holes 34 each have a circular cross-section with a diameter of about 4 cm.

Typical values for their flow-through area of each opening are between 1 and 15 $cm^2$, most typically between 2 and 10 $cm^2$, often with lower values of 3, 4 or 5 $cm^2$ and upper values of 7, 8, 9, 10 or 11 $cm^2$.

The flow through area of each opening 34 may be adjusted by a corresponding slider, symbolized by arrows S with the option to use one slider S as a control means for two or more of said openings 34. Said sliders S may be arranged on top or beneath said tray 32 and guided along corresponding rails (not illustrated), in an alternative the through-openings 34 are designed as valves with adjustable opening width.

Figure 3:
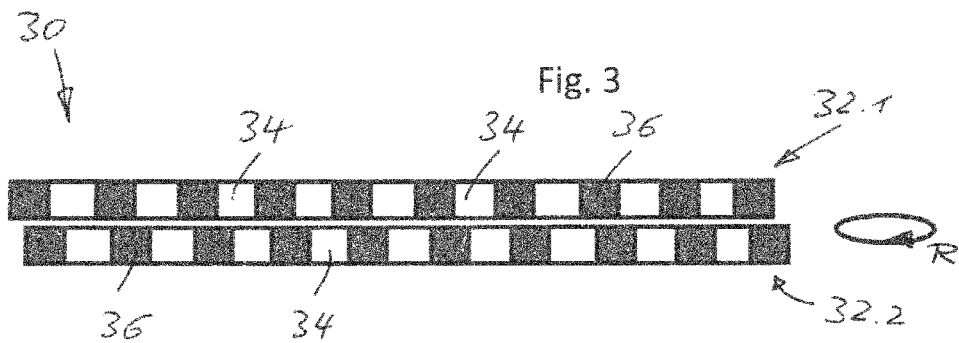
FIG. 3: A cross-sectional view of a second embodiment of a tray installation with two layers.

According to FIG. 3, said packing 30 comprises two layers, an upper layer 32.1 and a lower layer 32.2. Each layer/tray has a circular shape and extends all over the horizontal cross-section of the corresponding scrubber tower 10. Both of said trays 32.1, 32.2 are characterized by a multiplicity of discrete (individual) through holes 34, distributed along the corresponding tray 32.1, 32.2.

While the upper tray 32.1 is fixed to the wall 10*w* of scrubber tower 10 the lower tray 32.2 may be rotated (arrow R). For this purpose lower tray 32.2 is guided circumferentially in a corresponding bearing, which bearing being mounted to wall 10*w*.

Depending on the angle of rotation the overlap of openings 34 of upper tray 32.1 to openings 34 of lower tray 32.2 varies and may be adjusted between a "full opening" and a "full closure", according to the size and distribution of the openings 34.

While "full opening" describes the maximum flow through area for the liquid/gas and corresponds to the sum of the flow-through areas of all openings 34 of tray 32.1 the "fall closure" corresponds to a movement of lower tray 32.2 into a position when all solid bridges 36 between openings 34 of lower tray 32.2 are overlapping openings 34 in upper tray 32.1.

Because of the limited flow through area in case of installing said packing 30 compared with a scrubber tower 10 without any such packing 30 a liquid bath may be provided on top of said trays 32.1, 32.2, through which the flue gas passes on its way to exit 14.

Figure 4:
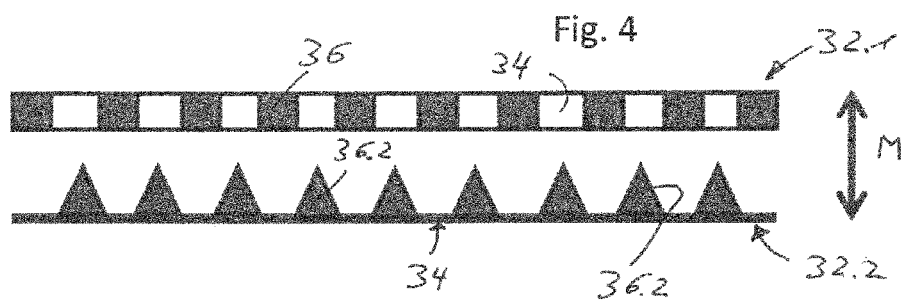
FIG. 4: A cross-sectional view of a third embodiment of a tray installation with two layers.

The embodiment according to FIG. 4 differs from that of FIG. 3 by a different design of lower tray 32.2. Bridges 36 of lower tray 32.2 according to FIG. 3 are replaced by male sections 36.2 shaped as pyramids.

These pyramids 36.2 are shaped in a way enabling the pyramids 36.2 to enter openings 34 of upper tray 32.1 when said upper tray 32.1 is moved towards lower tray 32.2 or vice versa (arrow M).

Depending on the movement (approach) the flow-through area of said openings 34 may be controlled very precisely.

Figure 5:
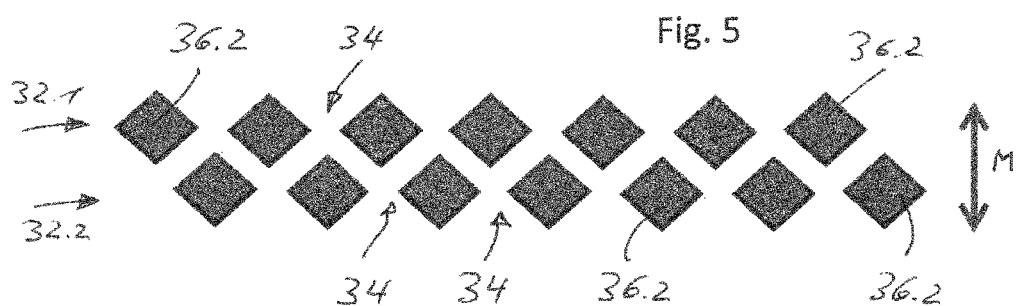
FIG. 5: A cross-sectional view of a fourth embodiment of a tray installation with two layers.

The embodiment of FIG. 5 is based on the general concept of the embodiment according to FIG. 4 to arrange at least two tray-like layers 32.1, 32.2 adjustable in height (arrow M).

The embodiment of FIG. 5 differs from that of FIG. 4 insofar as each of said layers 32.1, 32.2 is made of bars 36.2 arranged at a distance to each other thereby forming openings 34 of rectangular cross-section in between.

Each of said bars 36.2 has a rhombic cross-sectional, profile.

The bars of lower tray 32.2 are horizontally offset to those of upper layer/tray 32.1 such that the bars 36.2 of lower tray 32.2 are arranged below the respective openings 34 of upper tray 32.1.

This design allows to vary the size of said openings 34 when said bars 36.2 are moved upwardly, thereby closing said openings 34 continuously up to a full closure.

The bars 36.2 of each layer 32.1, 32.2 may be fixed in a common circumferential sheet (not illustrated), which sheet may be hingedly secured to a corresponding apparatus allowing the respective tray 32.1, 32.2 to be moved upwardly/downwardly.

All of the packings 30 mentioned above may be made of different materials like metal (steamless steel), plastics or the like.

Figure 6:
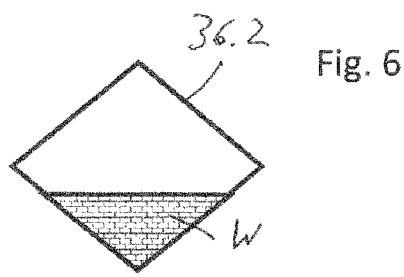
FIG. 6: A cross-sectional view of a bar as part of a tray (fifth embodiment).

The embodiment of FIG. 6 preferably uses a light plastic material to construct a bar 36.2 as represented.

This hollow bar 36.2 is partially filled with water W. Depending of the amount of water the corresponding bar 36.2 may either float on top of the liquid bath B provided on top of said packing 30 or may be more or less immersed within said liquid bath B.

This allows an amendment of the embodiment according to FIG. 5 as follows.

While the lower tray 32.2 is fixedly secured to scrubber tower wall 10w, upper tray 32.1 is made of bars 36.2 according to FIG. 6. This allows the bars 36.2 according to FIG. 6 to move into the opening area around openings 34 of lower tray 32.2 in case of more water W being filled into said hollow bars 36.2 or, the other way around, to float up within said liquid bath B in case of emptying said bars 36.2 from water.

Figure 7:
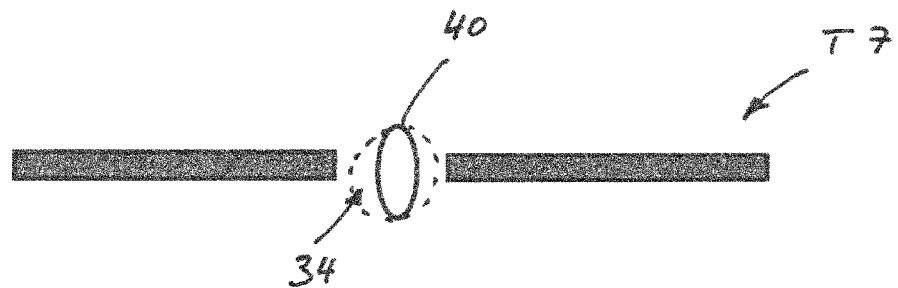
FIG. 7: Part of a sixth embodiment of a tray.

The tray T7 of FIG. 7 is characterized by inserts 40 arranged within openings 34. These inserts 34 may be filled with air. Due to their flexible skin the inserts then increase their size (see dotted line). As a consequence the space between the respective insert and the outer rim of the corresponding opening 34 will be reduced and thus the flow-through area of the tray installation reduced. By evacuating the insert(s) 40 the flow-through area may be increased again.

Figure 8:
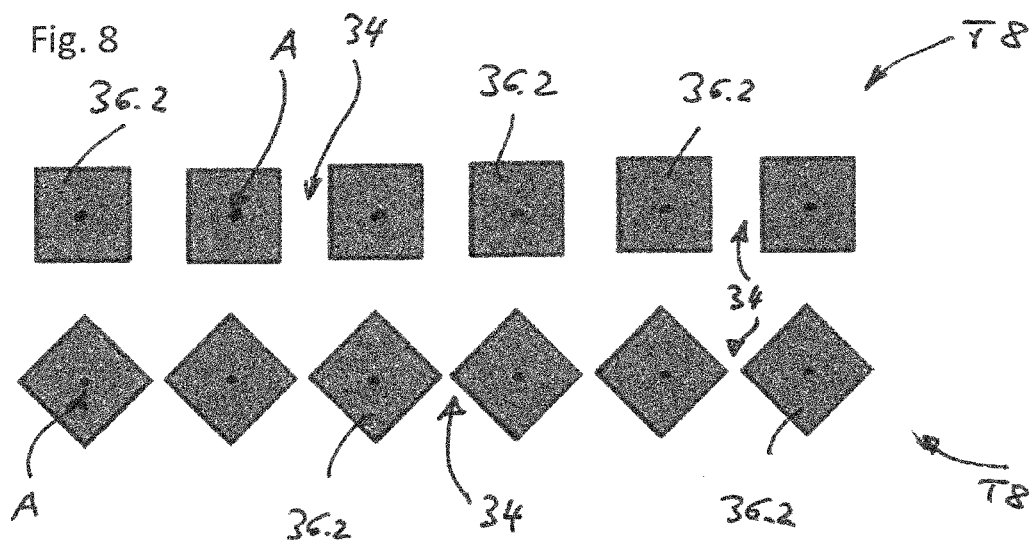
FIG. 8: A cross-sectional view of a seventh embodiment of a tray.

FIG. 8 represents an embodiment with a tray T8 made of bars 36.2, arranged at a distance to each other. Each bar 36.2 has a square cross section and is rotatable around a central axis A. By rotating the bars 36.2 the space (flow-through opening 34) between adjacent bars 36.2 may be adjusted as shown in the lower part of FIG. 8.

In this context the following dimensions of a typical scrubbing tower should be noted:
Height of the scrubbing tower 15-40 m.
Inner diameter of the scrubbing tower up to 25 m.
Flue gas flowing through the scrubbing tower 0.2-7.5 Mio. m$^3$/h,
Liquid (absorbent) flowing through the scrubbing tower: 5.000-60.000 m$^3$/h.

Having described the invention, the following is claimed:

1. A scrubber tower of a flue gas purification device, the scrubber tower comprising:
a flue gas entrance and a flue gas exit,
a liquid entrance and a liquid exit,
a contact area for a flue gas and a liquid between said flue gas entrance and said liquid entrance, and
at least one tray installation positioned within said contact area and across at least 50% of a horizontal extension of said contact area,
wherein said tray installation comprises a first layer with a multiplicity of through openings for said flue gas and said liquid respectively, and at least one further layer with a multiplicity of through openings for said flue gas and said liquid respectively, said at least one further layer being arranged vertically offset to any adjacent layer, wherein said through openings are adjustable individually, in groups, or all together in their respective cross sections, and
wherein said tray installation or at least one of the layers of said tray installation or at least one part of said tray installation is rotatable.

2. The scrubber tower according to claim 1, wherein said tray installation or at least one of the layers of said tray installation is shaped according to any of the following designs: grid, slatted frame, punched plate, perforated sheet, egg box, slotted plate, and sphere packing.

3. The scrubber tower according to claim 1, wherein said tray installation, at least one of the layers of said tray installation, at least one part of one of the layers of said tray installation, or at least one part of said tray installation is variable in its size by infilling a fluid or extracting a fluid.

4. The scrubber tower according to claim 1, wherein at least one of the through openings of the tray installation is equipped with inserts variable in size by infilling a fluid or extracting a fluid.

5. A scrubber tower of a flue gas purification device, the scrubber tower comprising:
a flue gas entrance and a flue gas exit,
a liquid entrance and a liquid exit,
a contact area for a flue gas and a liquid between said flue gas entrance and said liquid entrance, and
at least one tray installation positioned within said contact area and across at least 50% of a horizontal extension of said contact area,
wherein said tray installation comprises:
a first layer with a multiplicity of through openings for said flue gas and said liquid respectively, and
at least one further layer with a multiplicity of through openings for said flue gas and said liquid respectively, said at least one further layer being arranged vertically offset to any adjacent layer, wherein said through openings are adjustable individually, in groups, or all together in their respective cross sections, and
wherein at least one of the layers of said tray installation is equipped with discrete male sections for covering corresponding through openings of an adjacent layer and varying the cross section of the corresponding through openings when any of said layers is displaced.

6. The scrubber tower according to claim 5, wherein said tray installation or at least one of the layers of said tray installation is shaped according to any of the following designs: grid, slatted frame, punched plate, perforated sheet, egg box, slotted plate, and sphere packing.

7. The scrubber tower according to claim 5, wherein said tray installation, at least one of the layers of said tray installation, at least one part of one layer of said tray installation, or at least one part of one of said layers of said tray installation is variable in its size by infilling a fluid or extracting a fluid.

8. The scrubber tower according to claim 5, wherein at least one of the through openings of the tray installation is equipped with inserts variable in size by infilling a fluid or extracting a fluid.

* * * * *